US010185887B2

(12) United States Patent
Blanchflower et al.

(10) Patent No.: US 10,185,887 B2
(45) Date of Patent: Jan. 22, 2019

(54) TEXTUAL REPRESENTATION OF AN IMAGE

(71) Applicant: LONGSAND LIMITED, Cambridge (GB)

(72) Inventors: Sean Blanchflower, Cambridge (GB); Stephen Davis, Cambridge (GB)

(73) Assignee: LONGSAND LIMITED, Cambridge (GB)

( * ) Notice: Subject to any disclaimer, the term of this patent is extended or adjusted under 35 U.S.C. 154(b) by 306 days.

(21) Appl. No.: 14/769,621

(22) PCT Filed: Feb. 27, 2013

(86) PCT No.: PCT/EP2013/053973
§ 371 (c)(1),
(2) Date: Aug. 21, 2015

(87) PCT Pub. No.: WO2014/131447
PCT Pub. Date: Sep. 4, 2014

(65) Prior Publication Data
US 2016/0004928 A1 Jan. 7, 2016

(51) Int. Cl.
G06F 17/30 (2006.01)
G06K 9/46 (2006.01)
(Continued)

(52) U.S. Cl.
CPC ..... *G06K 9/4642* (2013.01); *G06F 17/30253* (2013.01); *G06F 17/30256* (2013.01);
(Continued)

(58) Field of Classification Search
CPC ......... G06F 17/30312; G06F 17/30253; G06F 17/30256; G06T 7/11; G06T 7/0081; G06T 1/0007; G06T 2207/20021; G06T 2207/10004; G06K 9/4642; G06K 9/4685; G06K 9/6878
(Continued)

(56) References Cited

U.S. PATENT DOCUMENTS 5,493,677 A 2/1996 Balogh et al.
8,290,269 B2 10/2012 Wu et al.
(Continued)

FOREIGN PATENT DOCUMENTS

WO WO-2011066486 A2 6/2011

OTHER PUBLICATIONS

Chang, S., et al., Representation and Retrieval of Symbolic Pictures Using Generalized 2D Strings, Proceedings of SPIE, vol. 1199, Nov. 1, 1989 (Nov. 1, 1989) pp. 1360-1372.
(Continued)

*Primary Examiner* — Greta L Robinson

(57) ABSTRACT

At least a computer-implemented method and an apparatus for processing an image are described. In examples, numeric values for at least one property of the image are determined. These values are then converted into at least one corresponding text character, said conversion being independent of any text content within the image. This enables a text representation of the image to be generated that contains said plurality of text characters. This text representation may be used to index and search for the image.

19 Claims, 7 Drawing Sheets

(51) Int. Cl.
*G06K 9/68* (2006.01)
*G06T 1/00* (2006.01)
*G06T 7/11* (2017.01)

(52) U.S. Cl.
CPC ..... *G06F 17/30312* (2013.01); *G06K 9/4685* (2013.01); *G06K 9/6878* (2013.01); *G06T 1/0007* (2013.01); *G06T 7/11* (2017.01); *G06T 2207/10004* (2013.01); *G06T 2207/20021* (2013.01)

(58) Field of Classification Search
USPC .................. 707/756, 758, 760, 915, 999.107; 382/173, 175, 176, 177, 194, 196, 232, 382/276, 290
See application file for complete search history.

(56) References Cited

U.S. PATENT DOCUMENTS

| | | | |
|---|---|---|---|
| 2002/0028020 A1* | 3/2002 | Fujiwara | G06K 9/00442 382/190 |
| 2003/0125967 A1* | 7/2003 | Josephsen | H04N 1/32133 705/51 |
| 2006/0251292 A1 | 11/2006 | Gokturk et al. | |
| 2009/0147042 A1 | 6/2009 | McAvoy et al. | |
| 2009/0148042 A1* | 6/2009 | Fan | G06K 9/6202 382/176 |

OTHER PUBLICATIONS

International Search Report & Written Opinion, dated Sep. 9, 2013, PCT Patent Application No. PCT/EP2013/053973, 11 pages.
Sinha, U., et al., Principal Component Analysis for Content-based Image Retrieval, Mar. 12, 2002, RadioGraphics, vol. 22, Issue 5, pp. 1271-1289.
Town, C., et al., Language-based Querying of Image Collections on the Basis of an Extensible Ontology, Image and Vision Computing, vol. 22, No. 3, Mar. 1, 2004, pp. 251-267.
Yao, B.Z., et al., I2T: Image Parsing to Text Description, Proceedings of the IEEE, vol. 98, No. 8, 1 Aug. 1, 2010, pp. 1485-1508.
Zhang, Y., et al., Image retrieval with geometry-preserving visual phrases Computer Vision and Pattern Recognition (CVPR), 2011 IEEE Conference on, IEEE, Jun. 20, 2011, pp. 809-816.
Zheng, Q., et al., Effective and Efficient Object-based Image Retrieval Using Visual Phrases, Proceedings of the 14th Annual ACM International Conference on Multimedia, Multimedia '06, Jan. 1, 2006, p. 77.
Pei Bei, et al., "Content Based Image Retrieval Using Perceptual Image Hashing", Journal Shanghai University (Natural Science Edition), vol. 18, Issue (4), 2012, 1 page.

* cited by examiner

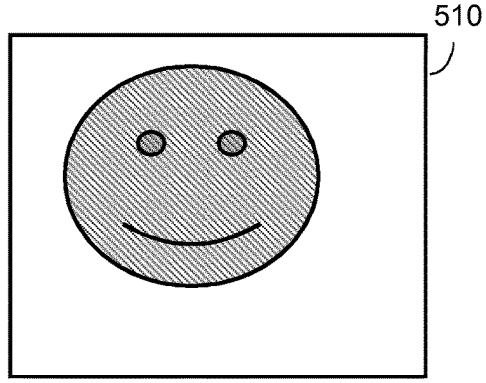
FIG. 5A
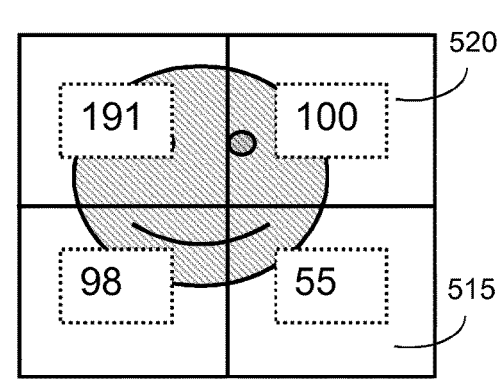
FIG. 5B
| Property Value | Character Mapping |
|---|---|
| 0-32 | A |
| 33-64 | B |
| 65-96 | C |
| 97-128 | D |
| 129-160 | E |
| 161-192 | F |
| 193-224 | G |
| 225-255 | H |
FIG. 5C
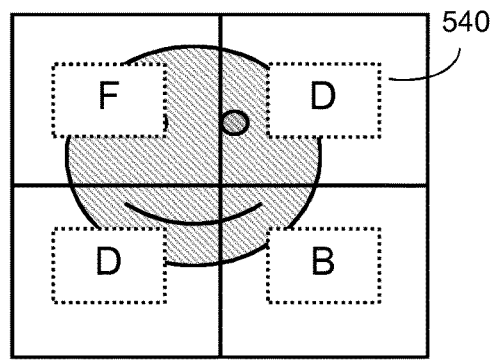
FIG. 5D
FIG. 5E

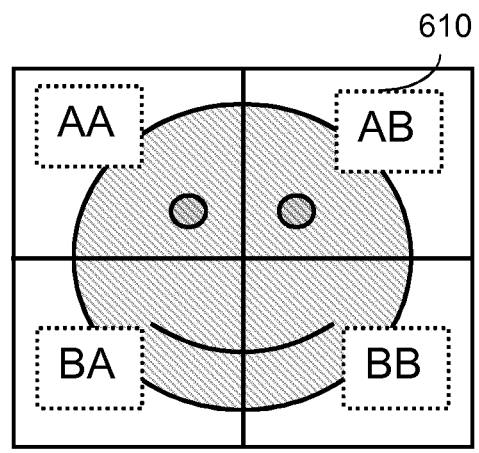
FIG. 6A
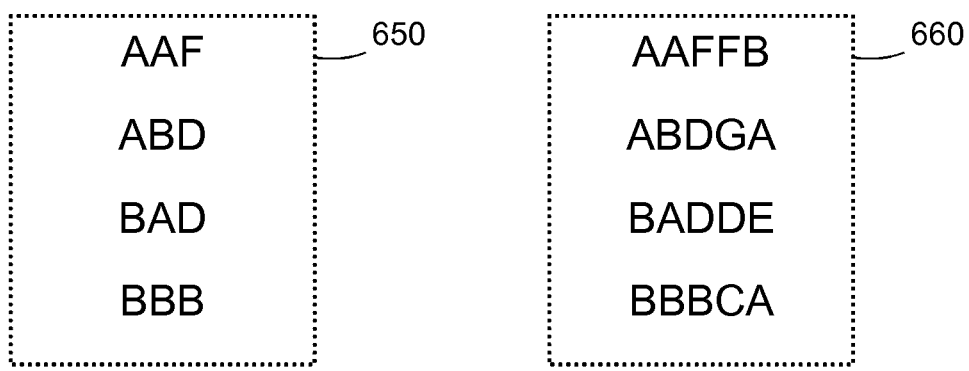
FIG. 6B  FIG. 6C

TEXTUAL REPRESENTATION OF AN IMAGE

BACKGROUND

Given an image, it is often useful to find any other similar images. For example, a library of images may be provided where it is useful to find images of interest in the library. These images of interest may be images that are related to a given image. One application of this technique is the detection of copyright violations. Other applications include the location of image art for creative works, license retrieval or image identification. Image matching techniques such as these typically involve extracting one or more features from a given image and then directly matching said features against features for other images.

BRIEF DESCRIPTION OF THE DRAWINGS

Various features and advantages of the present disclosure will be apparent from the detailed description which follows, taken in conjunction with the accompanying drawings, which together illustrate, by way of example only, features of the present disclosure, and wherein:

FIG. 5A is a schematic illustration of an image according to an example;

FIG. 5B is a schematic illustration showing values for an image property according to an example;

FIG. 5C is a table showing a mapping between values for an image property and text characters according to an example;

FIG. 5D is a schematic illustration showing text characters representative of values for an image property according to an example;

FIG. 5E is a schematic illustration showing a text representation of an image according to an example;

FIG. 6A is a schematic illustration showing a plurality of text characters representing locations in an image according to an example;

FIG. 6B is a schematic illustration showing a plurality of words in a text representation of an image according to an example;

FIG. 6C is a schematic illustration showing another plurality of words in a text representation of an image according to an example.

DETAILED DESCRIPTION

In the following description, for purposes of explanation, numerous specific details are set forth in order to provide a thorough understanding of the present method, apparatus and systems. It will be apparent, however, to one skilled in the art that the present method, apparatus and systems may be practiced without these specific details. Reference in the specification to "an example" or similar language means that a particular feature, structure, or characteristic described in connection with the example is included in at least that one example, but not necessarily in other examples.

Certain examples described herein provide improved techniques that allow versatile matching across disparate image types. These techniques comprise creating text-based data from an image. This text-based data may then be used by text-based information storage and/or retrieval systems that would typically not be suitable for use with images. Text processing methods, such as text-based pattern matching, natural-language processes and/or statistical analysis, may then be applied to the text-based data that is representative of the image. This may improve use and handling of images in large database systems. For example, it may enable faster image look-up, matching and/or retrieval.

Figure 1:
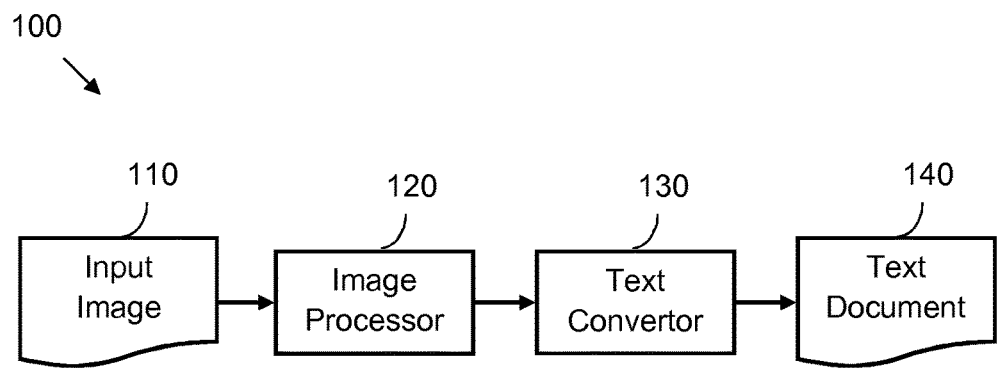
FIG. 1 is a schematic illustration of an apparatus for processing an image according to an example.

FIG. 1 shows an apparatus 100 for processing images. The apparatus comprises at least one image processor 120 and at least one text converter 130. The at least one image processor 120 receives an input image 110. The at least one image processor 120 processes the received input image 110 and determines one or more numeric values for one or more image properties associated with the image. These numeric values are then passed to the at least one text converter 130. The at least one text converter 130 converts the numeric values into a set of text characters. For example, the text converter 130 may map a particular numeric value for an image property variable to a text character that is representative of the particular numeric value or that is representative of a numeric range comprising the particular numeric value. This process may be repeated for one or more of: a plurality of image property variables; a plurality of numeric values for a particular image property; and a plurality of locations within the input image. The at least one text converter 130 is then arranged to output a text representation 140 for the input image 110. This text representation 140 may be a text document. The text representation 140 comprises the text characters determined by the text converter 130.

In one implementation, the at least one image processor 120 may comprise a hardware or programmatic interface arranged to receive image data. An input image 110 may comprise image data in, amongst others, one of the following file formats: JPEG (Joint Photographic Experts Group), PNG (Portable Network Graphics), GIF (Graphics Interchange Format), BMP (Windows Bitmap), RAW, TIFF (Tagged Image File Format), WMF (Windows MetaFile), VML (Vector Markup Language) etc. The input image 110 may be supplied in a raster format or in a vector format. It may use one of a variety of colour space formats. In certain examples, the input image 110 may be pre-processed to place it in a normalized or canonical form before being passed to the at least one image processor 120. For example, an input image 110 may be converted into a particular image format and/or colour space. An input image 110 may also be extracted from a document for use by the apparatus 100. For example, an input image 110 may be extracted from a web page (e.g. HyperText Markup Language—HTML document), a portable document format (PDF) document and/or a word processing document.

The at least one image processor 120 may comprise a suitably-configured hardware module and/or computer program code processed by a suitably-adapted hardware processor. An image processor may determine numeric values for a specific image property or for a plurality of image properties. In one example, an image processor may perform one or more calculations on numeric values representing pixels of the image to produce one or more numeric values representing an image property. An image processor may perform calculations on one or more colour channels of an image, i.e. on one or more pixel variables representing a particular colour in a colour space such as: Red, Green, Blue (RGB); Cyan Magenta Yellow blacK (CMYK); Hue, Saturation and Lightness (HSL—Lightness may be replaced with Value, Intensity or Brightness depending on the model used); and International Commission on Illumination (CIE) L*a*b* or XYZ colour spaces.

In certain examples, the at least one image processor 120 may extract one or more features from the input image 110 that are representative of one or more properties of the image. The features may be spatial and/or morphological features of the image or portions of the image. The features may comprise features generated as part of a Scale-Invariant Feature Transform (SIFT) and/or a Speeded Up Robust Features (SURF). Further details of a SIFT feature extractor are described in U.S. Pat. No. 6,711,293. In cases such as these, SIFT descriptors for portions of an image may be determined by the at least one image processor 120, for example comprising pixel gradient vectors with a plurality of numeric values corresponding to a region associated with pixel amplitude extrema. Similarly an image processor may generate numeric values for features such as those described in Content-Based Image Retrieval Using Perceptual Image Hashing, J. Shanghai University (Natural Science Edition), 2012, V18(4): 335-341.

The at least one text converter 130 may comprise a suitably-configured hardware module and/or computer program code processed by a suitably-adapted hardware processor. It may comprise a hardware or programmatic interface arranged to receive numeric values for one or more image properties. The numeric values may be passed to the at least one text converter 130 as a numeric data structure such as a list or array, e.g. a data structure and/or reference representing a plurality of memory locations storing said values. In certain examples, a text converter 130 may use a mapping definition to convert a particular numeric value to a text character equivalent. The mapping definition may be in the form of a mapping function or a look-up table. A text character generated by the at least one text converter may be added to a string data structure and/or output to a text-based file format. Text characters for multiple numeric values may be concatenated. Padding characters such as spaces and/or punctuation characters may be added as required; for example, text characters may be separated using spaces or commas in an output text-based file. Start-of-file and/or end-of-file markers may be added at the respective start and end of the text conversion process as required by the implementation. The text-based file format may be, amongst others, one of a: text file (e.g. an American Standard Code for Information Interchange (ASCII) or Universal Character Set Transformation Format (UTF) file); a comma-separated value file; an HTML or Extensible Markup Language (XML) file. An output text representation 140 may also comprise a portion of a particular file, for example a portion of string data in XML format.

Figure 2:
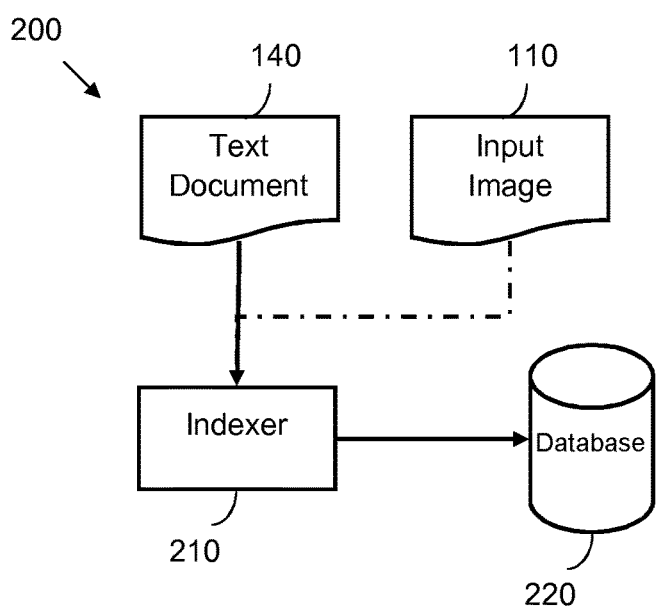
FIG. 2 is a schematic illustration of a system for indexing an image according to an example.

FIG. 2 shows an indexing system 200 that may use the text representation output by the apparatus of FIG. 1. The indexing system comprises an indexer 210 that is arranged to receive a text representation 140 that is output by the text converter 130. Each text representation 140 is based on a particular input image 110 as described above. The indexer 210 processes the text representation 140 and uses the text data therein to index said particular input image 110 in at least one information storage system such as database 220. The indexer 210 may index the text representation 140 with or without the input image itself. For example, an entry in the database 220 may comprise data based on the text representation 140 together with an identifier for the image, wherein the image itself is stored in a separate information storage system. Alternatively, data based on the text representation 140 may comprise metadata that is stored together with an image in a particular record of a database. In certain examples, the database 220 is a text-based database. In these cases the indexer 210 may form part of a database management system (DBMS) that is configured to store and retrieve text-based data. In these cases, a text or string field in the database 220 may store the text representation 140 or a processed version thereof.

The indexing system 200 of FIG. 2 may be used to index a corpus, i.e. a plurality, of images in a text-based database 220. Index data for the corpus may then be used by a search system, such as a DMBS, to locate and/or match images. An example of a search system is shown in FIG. 3A.

Figure 3A:
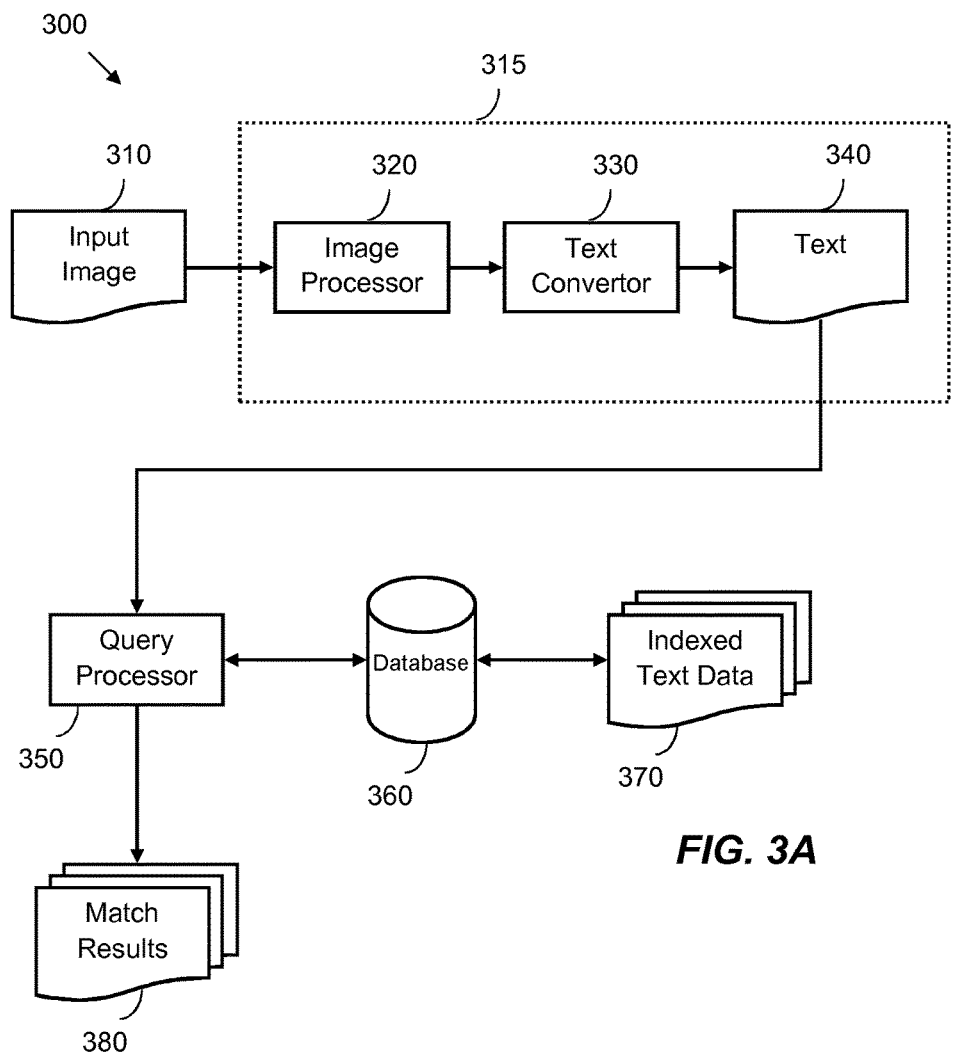
FIG. 3A is a schematic illustration of a system for image matching according to an example.

FIG. 3A shows a search system 300 that uses an apparatus similar to that described in FIG. 1. The search system 300 may be used to perform image matching based on an input image 310. In this case "image matching" may comprise determining if images exist that directly and/or probabilistically match input image 310, e.g. that have text representations that are identical to or similar to a text representation of an input image. Any matching images, or references to such images, may then be returned in response to a search query.

The search system 300 of FIG. 3A comprises a search query interface 315 that is arranged to receive an input image 310 to be matched. The search query interface 315 is arranged to pass the received input image 310 to at least one image processor 320. The at least one image processor 320 processes the received input image 310 and determines one or more numeric values for one or more image properties associated with the image in a similar manner to the at least one image processor 120. In one example, the at least one image processor 120 may be re-used to implement the at least one image processor 320. The numeric values determined by the at least one image processor 320 are passed to at least one text converter 330. In a similar manner to at least one text converter 130, the at least one text converter 330 converts the numeric values into a set of text characters. The at least one text converter 330 is arranged to output a text representation 340 for the input image 310. In one example, the at least one text converter 130 may be re-used to implement the at least one text converter 330. The text representation 340 is used to construct a search query that may be applied to a corpus of indexed images.

In FIG. 3A, the search query interface 315 is communicatively coupled to a search query processor 350. Data corresponding to text representation 140 is communicated to the search query processor 350. In one example, the search query interface 315 may process the text representation so as to locally generate a search query that is passed to the search query processor 350. In another example, the search query interface 315 may pass at least a portion of the text representation 340 to the search query processor 350, wherein a search query is generated locally by the search query processor 350. In certain cases, query generation may be split between the search query interface 315 and the search query processor 350 as required per implementation.

The search query processor 350 is arranged to apply a generated search query to an information storage system, such as at least one database 360. The search query processor 350 uses data based on the text representation 340 in the search query to determine if data based on previously-generated (and indexed) text representations 370 is present in the at least one database 360. This may comprise determining whether a whole or part of indexed text data 370 matches the text representation 340 generated by the search query interface 315. In performing matching, standard text-based information retrieval techniques may be applied, such as probabilistic and/or statistical techniques. These techniques may be based on Bayesian methods. For example, the query processor 350 may be arranged to determine a frequency profile of sequences of one or more text characters in the text representation 340 and compare this with a plurality of frequency profiles for text representations of indexed images. The query processor 350 may also be arranged to determine if a direct match occurs (within particular predetermined tolerances). A direct match may enable an unknown input image 310 to be identified. Criteria for the matching images may be defined as part of the query processor 350.

In FIG. 3A, if one or more records forming indexed text data 370 are deemed to match data based on text representation 340, then the query processor 350 returns a set of match results 380. These may be communicated to a user or a process that initiated the search. The match results 380 may comprise identifiers for matching images. The match results 380 may also or alternatively comprise representations of one or more matching images; for example, thumbnails or other reduced-resolution versions of matching images. Matching images may be retrieved from one or more databases based on image identifiers associated with records from at least one database 360. In other cases, an image may be stored in a field of a record that also has a field storing data derived from a text representation; in this case, a matching image may be retrieved from such a field.

Figure 3B:
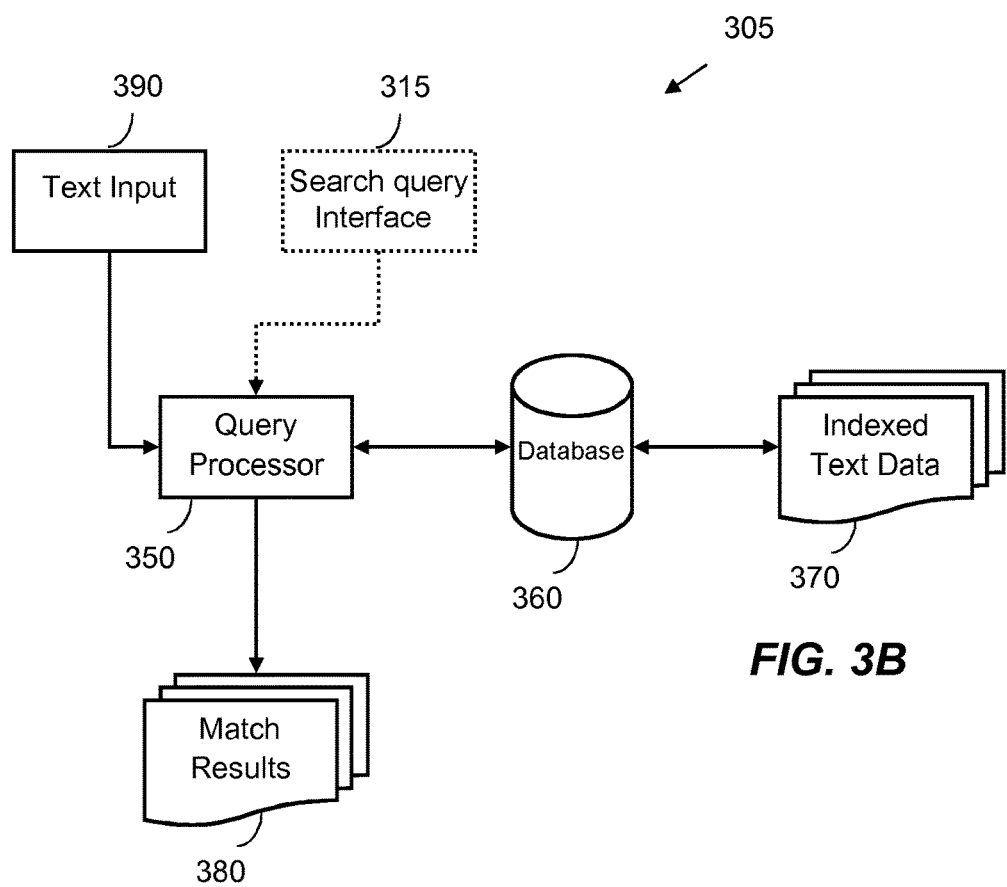
FIG. 3B is a schematic illustration of a variation of the system of FIG. 3A.

FIG. 3B shows a variation 305 of the search system of FIG. 3A. In FIG. 3B the query processor 350 is arranged to receive a text query from a text input 390. Text input 390 may comprise, in a simple case, a text box input. In this case a text query may be received as well as, or instead of, an image-originating query as generated via the search query interface 315. The text query received from the text input 390 may originate from a user. In this case it may comprise one or more keywords or a natural language phrase. The query processor 350 in this variation is arranged to convert the text query into a query that may be applied to the indexed text data 370 stored in the at least one database 360. For example if the text query contains the keyword "blue", this may be converted into a range of numeric values that in turn is converted into a text representation within the ontology used for the indexed text data 370. A text query and an image-originating search query may be combined into a composite search query. For example, the text query may be used to narrow the match results of FIG. 3A.

An example of a method of processing an image will now be described with reference to FIG. 4. This method 400 may be implemented using the apparatus 100 of FIG. 1, or may be implemented using other appropriate components. The method 400 may also be incorporated in the indexing system 200 of FIG. 2 and the search systems 300, 305 of FIGS. 3A and 3B.

At block 410 an image is received. At block 420 one or more numeric values for at least one image property are determined. In certain cases numeric values may be determined for a plurality of regions of an image. For example, a window function may be consecutively applied to groups of pixels within the image. A window function may be applied to a particular range of pixels, for example a function with a 3×3 square window may be consecutively applied to different groups of nine pixels centered on a pixel of interest. In this case a numeric value for an image property may be calculated for a plurality of pixels of interest, wherein the numeric value is based on at least a set of surrounding pixel values. These pixels of interest may be selected by performing a raster scan of the image. A plurality of numeric values may be determined for a respective plurality of different image properties for a pixel of interest. In other cases a region of an image may be selected as a portion of the image. For example, an image may be split into a particular number of regions and one or more numeric values for at least one image property may be determined for each region.

In other cases, block 420 may comprise locating one or more features in the image. Numeric values for properties associated with these features may then be determined. For example, block 420 may comprise a pre-processing operation to locate pixel amplitude extrema. Magnitude and/or angle values for one or more pixel gradients associated with each extrema may then be determined. In any case, one or more numeric values are output when block 420 is complete.

At block 430 the previously-determined numeric values are converted to at least one text character. This conversion block may be based on a mapping between a numeric value and a set of text characters. For example, a numeric value may be an integer within a particular range of values such as 0 to 255. Each value within this range may be mapped to a unique set of one or more text characters within one or more alphabets. If a Latin or Roman alphabet is used with 26 possible text characters (e.g. upper text characters) then two characters from this alphabet would enable the example range of numeric values to be represented. Alternatively a numeric value may be subject to a histogram analysis with discrete intervals or ranges that are mapped to particular text characters (in effect quantising the numeric value). For example, discrete intervals of 10 would enable 26 text characters to represent numeric values between 0 and 255. For each implementation a configuration that balances accuracy and verbosity may be selected. In certain cases a range of useable text characters may be extended by using a plurality of alphabets, e.g. Greek, Cyrillic or Asian alphabets.

At block 430, additional text characters may be added to the at least one text character representing the numeric value. These additional text characters may represent, amongst others, one or more of: pixel or region location, e.g. a mapped two dimensional pixel co-ordinate or co-ordinates representing a range of pixels; an image property identifier; an identifier for a colour space component, e.g. if numeric values are determined for a plurality of colour channels; values for one or more configuration parameters etc. These additional text characters may be generated using a similar mapping process to that used for the numeric values for the image property. If a plurality of text characters is generated then this may comprise a "word". Additional text characters that form part of a particular file format may also be added, for example HTML or XML tags.

At block 440, the one or more text characters generated in block 430 are stored as part of a text representation. This block may comprise a string concatenation operation to add one or more recently-generated text characters to a data structure (e.g. a set of memory locations) comprising previously-generated text characters for the image. Alternatively this block may comprise a file or file-buffer write operation. At this stage, formatting may also be applied if required.

Figure 4:
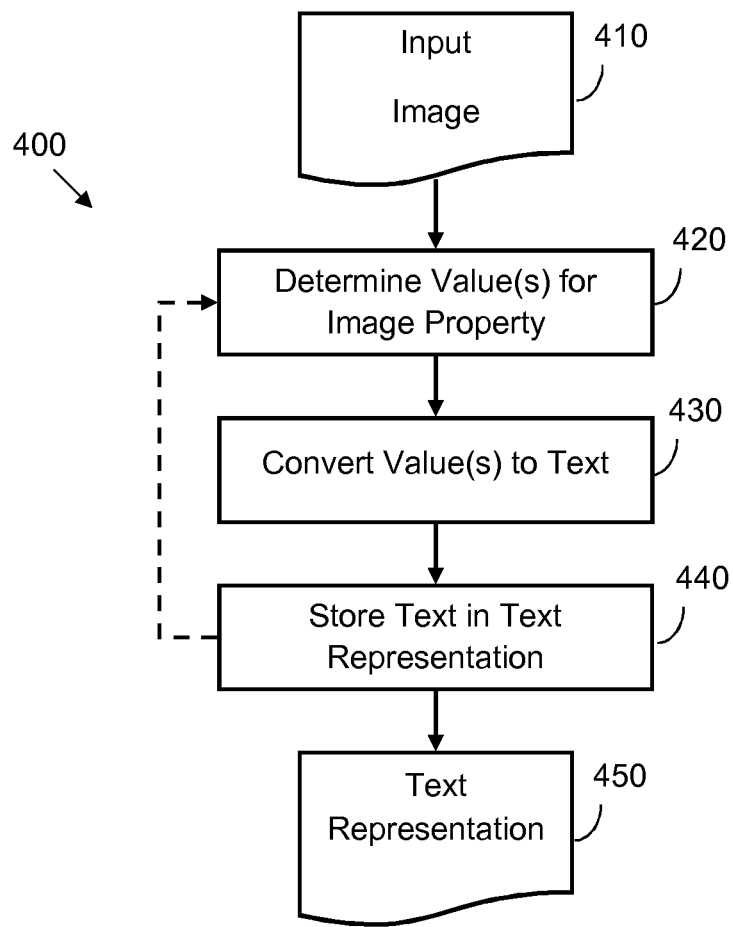
FIG. 4 is a flow chart showing a method of processing an image according to an example.

As shown in FIG. 4, blocks 420, 430 and 440 may be repeated in certain examples. For example the blocks may be repeated for a plurality of pixels of interest or image regions. Likewise the blocks may also, or alternatively, be repeated for a plurality of image properties and/or a plurality of image features. Each iteration of these blocks may generate a particular word comprising a plurality of characters. For example, each pixel, image region and/or feature may have one or more associated words. Image regions need not be uniformly distributed across an image; for example a reduced region or window size may be applied at the centre of an image to provide a greater number of measurements in this area.

The output of the method 400 is a text representation 450. This may comprise a text-based document that in turn comprises a plurality of text characters. These text characters may be arranged in sets of characters that are referred to herein as words. These words may or may not be spaced using padding characters such as spaces or commas. In one case the text representation 450 may be stored directly as a field in a record of a database. In other cases it may be passed to one or more functions as a string or other text-based variable such as a character array. These functions may comprise indexing, search or other image processing functions.

FIGS. 5A to 5E show an example implementation of the apparatus and/or method described herein. This example is necessarily simplified for ease of explanation. As such, certain details have been omitted for clarity. Furthermore, the example represents one of many different image processing methods that may be applied to generate numeric values.

FIG. 5A shows an input image 510 to be processed in the present example. FIG. 5B represents an output that may be generated by an image processor 120 in FIG. 1 and/or the application of block 410 in FIG. 4. FIG. 5B demonstrates how an image may be decomposed into a number of image regions 515. In this simplified example there are four image regions. FIG. 5B also shows a numeric value 520 that has been calculated for each image region. In this example the image property comprises an average pixel intensity. As such FIG. 5B shows four average pixel intensity values 520, wherein each value corresponds to a particular region (i.e. represents the average pixel intensity for at least one colour component within a particular region). FIG. 5C shows a look-up table that may be used to map each average pixel intensity value to a particular text character. In this example the average pixel intensity values are quantised into eight ranges, wherein each range is mapped to a particular upper case character of a Latin alphabet. FIG. 5D shows the result of applying the mapping illustrated in FIG. 5C to the numeric values shown in FIG. 5B. In this case each of the four numeric values has been mapped to a corresponding text character. As such FIG. 5D may represent the operation of text converter 130 in FIG. 1 and/or block 420 in FIG. 4. FIG. 5E then shows an output text representation 550 wherein the mapped text characters of FIG. 5D are combined in a single representation. In this simple case the text representation comprises the string "FDDB" representing the average pixel intensities in four regions of image 510. In other practical implementations the output text representation may comprise many more text characters.

FIGS. 6A, 6B and 6C show how text characters identifying particular pixels of interest and/or image regions may be combined with the mapped text characters. In FIG. 6A four text character identifiers are shown that uniquely identify each of the image regions shown in FIG. 5B. In this case a first image region has a region identifier of AA, a second image region has a region identifier of AB, a third image region has a region identifier of BA, and a fourth image region has a region identifier of BB. In another example, each of the numeric values for an X and Y co-ordinates of a centre pixel in each region may alternatively be mapped to a text character. FIG. 6B shows an example text representation 650 where the text-based image region identifiers are combined with the text characters representing the numeric values of the image property. As such FIG. 6B shows four words, where each word combines a particular text-based image region identifier and an associated image property value representation: AAF, ABD, BAD, and BBB. In the present example, these words are shown separated by an end-of-line character. FIG. 6C shows another example where a text character is determined for each of three colour components. For example, these colour components may correspond to each channel in an RGB or HSL colour space. As such the words shown in the text representation 660 of FIG. 6C have a length of five characters: the first two characters correspond to a region identifier and each of the last three characters correspond to an average pixel intensity for a different colour channel. In other examples the order of the text characters may be changed as required.

Figure 7:
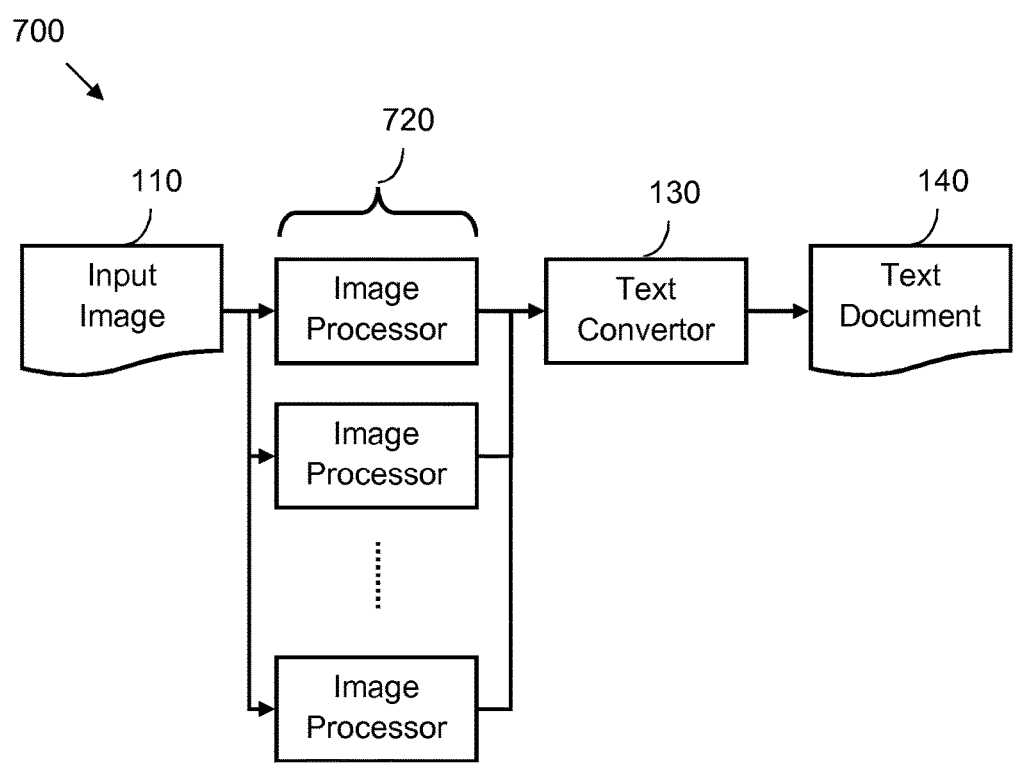
FIG. 7 is a schematic illustration of an apparatus for processing an image according to a variation.

FIG. 7 shows a variation 700 of the apparatus of FIG. 1. The components of FIG. 7 are similar to those of FIG. 1 although in the present case several image processors 720 are applied to the input image 110. The image processors 720 may be applied in parallel as shown in FIG. 7 or one after each other in time. Each image processor may be arranged to determine one or more numeric values for a respective image property. In FIG. 7 each of the plurality of image processors 720 is communicatively coupled to a common text converter 130. However, in other variations a plurality of text converters may be provided; for example, the output of each image processor may be supplied to a separate text converter, wherein the output of all text converters is combined to form a text representation 140. The variation of FIG. 7 allows region-based image property calculations and feature-based image property calculations to be applied in parallel, wherein the outputs of both techniques are combined in the resulting text representation.

Certain examples described herein provide apparatus, methods and systems that can store and search image-based data. Certain examples described herein create a set of textual features as part of an image processing and/or feature extraction step. This enables a textual "document" to be generated. This textual document can then be indexed in a textual database. A corpus of images may then be 'indexed' into the database so that similar and/or identical images can be found using the system. The input images to such systems may be seen or unseen, i.e. it is not important if the image has already been indexed in the system. By generating a text representation text and natural language processing techniques that are adapted for handling the disparate nature of language may be applied. This then provides a robust indexing and search system. It may also provide an increase in speed as many systems are optimized for text look-up operations.

The text characters that are generated by certain examples described herein may be limited to a particular subset of text characters. This particular subset of text characters may be tailored for a particular indexing, query and/or database system. For example, if only case-insensitive searches and/or storage are supported, the text characters may be restricted to one of upper case or lower case text characters from a particular character set. Additionally, for certain implementations it may be desired to limit the subset of text characters to avoid the use of non-printing, control and/or punctuation characters.

The examples described herein may be distinguished from optical character recognition (OCR) techniques. These techniques aim to extract text content that is present in an image. As such, in these cases, there is a correspondence between text characters output by the system and the content of the image, i.e. representations of the text characters are present in the image. In the present examples the text characters output by the system are independent of the content of the image, e.g. there is typically no correlation between specific text characters present in the image and the output of the present system. For example a word in an image written in two different fonts would result in the same set of output text characters in an OCR system, whereas visual properties of the image may vary generating different text character outputs in the present case. In addition the text representations output by the present examples may have no intelligible meaning for a human reader, e.g. any words that are output will typically not correspond to permitted words as represented by a dictionary for a particular language (any correspondence that does occur will be random). Likewise, the described examples directly convert a numeric representation, for example a measurement or metric, into a low-level text character equivalent. As such the text characters do not represent known names or words from a dictionary that are applied to discrete items that are identified or detected in the content of the image. The examples of the presently described examples may also be distinguished from a hexadecimal representation of a binary file. In the case of a binary the data is numeric rather than textual. Text-based search and storage would not operate correctly on a binary file.

At least some aspects of the examples described herein with reference to the drawings may be implemented using computer processes operating in processing systems or processors. For example, these processing systems or processors may implement the at least one image processor 120/320, the at least one text converter 130/330, the indexer 210, the search query interface 315 and/or the search query processor 350. These aspects may also be extended to computer programs, particularly computer programs on or in a carrier, adapted for putting the aspects into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

Similarly, it will be understood that any apparatus referred to herein may in practice be provided by a single chip or integrated circuit or plural chips or integrated circuits, optionally provided as a chipset, an application-specific integrated circuit (ASIC), field-programmable gate array (FPGA), etc. The chip or chips may comprise circuitry (as well as possibly firmware) for embodying at least a data processor or processors as described above, which are configurable so as to operate in accordance with the described examples. In this regard, the described examples may be implemented at least in part by computer software stored in (non-transitory) memory and executable by the processor, or by hardware, or by a combination of tangibly stored software and hardware (and tangibly stored firmware).

The preceding description has been presented only to illustrate and describe examples of the principles described. For example, the components illustrated in any of the Figures may be implemented as part of a single hardware system, for example using a server architecture, or may form part of a distributed system. In a distributed system one or more components may be locally or remotely located from one or more other components and appropriately communicatively coupled. For example, client-server or peer-to-peer architectures that communicate over local or wide area networks may be used. With reference to the examples of FIGS. 3A and 3B an image that is stored locally on a client device may be communicated to a server to perform a search query. Text conversion of numeric values representative of image properties may be performed locally, e.g. on a client device, in middle-ware servers and/or at a server implementing query processor 350. Reference to at least one database includes distributed database architectures that comprise a plurality of storage nodes such as so-called "cloud" storage systems. Numeric values are described herein may comprise variables of any known numeric data format, such as integers, shorts, longs, floats etc. This description is not intended to be exhaustive or to limit these principles to any precise form disclosed. Many modifications and variations are possible in light of the above teaching.

What is claimed is:

1. A computer-implemented method of processing an image comprising:

determining, by a processor of a computing device, a numeric value that represents an average pixel intensity of colors within each of a plurality of regions of the image, the numeric value representing the average pixel intensity for each region of the image being independent of any text content within the region of the image;

converting, by the processor, each of the numeric values for each region of the image into an alphabet representing the average pixel intensity for the region, wherein the alphabet for the region of the image is independent of any text content within the region of the image; and combining, by the processor, the alphabets for the regions of the image into a string of alphabets to represent the average pixel intensities of the image; and outputting, by the processor, the string of alphabets of the image, wherein the string of alphabets of the image is used to construct a search query to be applied to a database storing previously-generated strings of alphabets of different images to locate the image.

2. The computer-implemented method according to claim 1, further comprising: storing the string of alphabets representing the average pixel intensities of the image in an index of the database.

3. The computer-implemented method according to claim 1, wherein the alphabet for each region includes a string of three alphabets representing average pixel intensities of three different colors in the region.

4. The computer-implemented method according to claim 1, wherein the method further comprises, for each particular region of the image:

determining a text character that represents an identifier of the particular region of the image; and combining the text character representing the identifier of the particular region and the alphabet representing the average pixel intensity for the particular region into one word for the particular region, wherein a text representation of the image comprises a combination of the words for the regions of the image.

5. The computer-implemented method according to claim 1, further comprising:
determining a mapping table that maps a plurality of ranges of numeric values to corresponding alphabets, wherein converting each of the numeric values into an alphabet comprises using the mapping table to determine the alphabet corresponding to the numeric value of each region of the image.

6. The computer-implemented method according to claim 1, wherein determining a numeric value for each of the plurality of regions of the image further comprises determining a numeric value for a feature in the region of the image, the feature being representative of a property of the region of the image.

7. The computer-implemented method according to claim 6, wherein converting each of the numeric values for each region of the image into an alphabet comprises combining the alphabet corresponding to the numeric value for the region with one or more of:
a text character identifying a particular feature in the region; and
a text character identifying a location of the particular feature in the region of the image, wherein the alphabet and text characters are combined to generate a word to represent the region of the image and wherein a text representation of the image comprises a combination of the words for the regions of the image.

8. Apparatus for processing an image comprising:
an interface to receive an image;
an image processor communicatively coupled to the interface and to determine a numeric value that represents an average pixel intensity of colors within each of a plurality of regions of the received image, the numeric value representing the average pixel intensity for each region of the image being independent of any text content within the region of the image; and
a text converter communicatively coupled to the image processor to receive the numeric values, convert each of the numeric values for each region of the image into a text character representing the average pixel intensity of the region, wherein the text character for the region of the image is independent of any text content within the region of the image, and output a string of the text characters representing the average pixel intensities of the regions of the image,
wherein the string of the text characters of the image is to be used to construct a search query to be applied to a database storing previously-generated strings of text characters of different images to locate the image.

9. Apparatus according to claim 8, wherein the text converter is to determine a text character that represents an identifier of each region of the image, the text converter to combine the text character representing the identifier of the region of the image with the text character converted from the numeric value representing the average pixel intensity of the region into one word, wherein a text representation of the image output by the text converter comprises a combination of the words for the regions of the image.

10. An indexing system comprising:
an interface for receiving an image;
an image processor communicatively coupled to the interface and to determine a numeric value that represents an average pixel intensity of colors within a plurality of regions of the received image, the numeric value representing the average pixel intensity for each region of the image being independent of any text content within the region of the image;
a text converter communicatively coupled to the image processor to convert each of the numeric values for each region of the image into a text character representing the average pixel intensity of the region, wherein the text character for each region of the image is independent of any text content within the image, and output a string of the text characters representing the average pixel intensities of the regions of the image; and
a database to store previously generated strings of text characters representing average pixel intensities of different images,
wherein the string of text characters representing the average pixel intensities of the image is used to construct a search query to be applied to the database to locate the image.

11. The indexing system of claim 10, wherein the text character for each region is an alphabet.

12. The indexing system of claim 10, wherein the text converter is to:
determine a text character that represents an identifier of each particular region of the image; and
combine the text character converted from the numeric value for the particular region and the text character representing the identifier of the particular region into one word, wherein a text representation of the image comprises a combination of the words for the regions of the image.

13. A system for image matching comprising:
a search query interface for receiving an image to be matched;
an image processor communicatively coupled to the search query interface to determine a numeric value that represents an average pixel intensity of colors within each of a plurality of regions of the received image, the numeric value for each region of the image being independent of any text content within the region of the image;
a text converter communicatively coupled to the image processor to convert each of the numeric values for each region of the image into an alphabet representing the average pixel intensity of the region, wherein the alphabet for the region of the image is independent of any text content within the region of the image, and output a string of the alphabets representing the average pixel intensities of the regions of the image;
a text database storing a plurality of strings of alphabets representing average pixel intensities of a plurality of images; and
a search query processor communicatively coupled to the text converter and the text database to use the string of alphabets output by the text converter to construct a search query to be applied to the text database to match the string of alphabets of the image output by the text converter against the plurality of strings of alphabets stored in the text database.

14. The system according to claim 13, wherein the search query processor is to probabilistically match the string of alphabets of the image output by the text converter against the plurality of strings of alphabets stored in the text database.

15. The system according to claim 13, further comprising:
an image database storing the plurality of images; and
an image matching processor to match numeric features of the image received at the search query interface against the plurality of images stored in the image database, wherein the output of the image matching processor and the search query processor are combined to match the image received at the search query interface.

16. A computer program product comprising a non-transitory computer-readable storage medium having computer readable instructions stored thereon, the computer readable instructions being executable by a computerized device to cause the computerized device to:
receive an image;
determine a numeric value that represents an average pixel intensity of colors within each of a plurality of regions of the image, the numeric value representing the average pixel intensity for each region of the image being independent of any text content within the region of the image;
convert each of the numeric values for each region of the image into an alphabet, wherein the alphabets for the regions of the image are independent of any text content within the regions of the image; and
output a string of the alphabets representing the average pixel intensities of the image,
wherein the string of the alphabets of the image is used to construct a search query to be applied to a database storing previously-generated strings of alphabets of different images to locate the image.

17. The computer program product of claim 16, wherein the computer readable instructions are to cause the computerized device to:
store the string of alphabets of the image in an index of the database.

18. The computer program product of claim 16, wherein the computer readable instructions to convert each of the numeric values for each region into an alphabet include computer readable instructions that are to cause the computerized device to:
convert each of the numeric values for each region of the image into an alphabet based on a mapping table that maps ranges of pixel intensity values to corresponding alphabets.

19. The computer program product of claim 16, wherein the computer readable instructions are to cause the computerized device to:
determine a text character that represents an identifier of each particular region of the image; and
combine representing the identifier of the particular region and the alphabet for the particular region into one word for the region, wherein a text representation of the image comprises a combination of the words for the regions.

* * * * *